United States Patent
McCrary (10) Patent No.: US 12,051,144 B2
(45) Date of Patent: Jul. 30, 2024

(54) FULLY UTILIZED HARDWARE IN A MULTI-TENANCY GRAPHICS PROCESSING UNIT

(71) Applicant: ADVANCED MICRO DEVICES, INC., Santa Clara, CA (US)

(72) Inventor: Rex Eldon McCrary, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/804,334

(22) Filed: Feb. 28, 2020

(65) Prior Publication Data
US 2021/0272347 A1   Sep. 2, 2021

(51) Int. Cl.
*G06T 15/00* (2011.01)
(52) U.S. Cl.
CPC .................. *G06T 15/005* (2013.01)
(58) Field of Classification Search
CPC ... G06T 19/005; G06T 19/006; G06T 15/005; G06F 3/011; G06F 3/017; G06F 3/167
See application file for complete search history.

(56) References Cited

U.S. PATENT DOCUMENTS

| | | | | |
|---|---|---|---|---|
| 7,728,841 B1 * | 6/2010 | Nordquist | .............. | G09G 5/393 345/533 |
| 7,830,392 B1 * | 11/2010 | Danskin | ................. | G09G 5/363 345/612 |
| 8,933,943 B2 * | 1/2015 | Soupikov | .............. | G06T 15/005 718/105 |
| 9,142,057 B2 * | 9/2015 | Mantor | ................. | G06T 15/005 |
| 2002/0010735 A1 * | 1/2002 | McMillen | ................ | H04Q 3/68 370/254 |
| 2007/0296729 A1 * | 12/2007 | Du | ....................... | G06F 9/30138 345/559 |
| 2008/0074430 A1 * | 3/2008 | Jiao | ........................ | G06T 15/005 345/506 |
| 2011/0080415 A1 * | 4/2011 | Duluk, Jr. | ............. | G06T 15/005 345/506 |

(Continued)

FOREIGN PATENT DOCUMENTS

| CN | 1860448 A | * 11/2006 | .............. | G06F 9/54 |
|---|---|---|---|---|
| KR | 1020100029230 A | 3/2010 | | |

OTHER PUBLICATIONS

International Search Report and Written Opinion issued in Application No. PCT/US2021/019790 dated Jun. 17, 2021, 11 pages.

(Continued)

*Primary Examiner* — Ryan R Yang (57) ABSTRACT

An apparatus such as a graphics processing unit (GPU) includes a set of shader engines and a set of front end (FE) circuits. Subsets of the set of FE circuits schedule geometry workloads for subsets of the set of shader engines based on a mapping. The apparatus also includes a set of physical paths that convey information from the set of FE circuits to a memory via the set of shader engines. Subsets of the set of physical paths are allocated to the subsets of the set of FE circuits and the subsets of the set of shader engines based on the mapping. The mapping determines information stored in a set of registers used to configure the apparatus. In some cases, the set of registers store information indicating a spatial partitioning of the set of physical paths.

22 Claims, 11 Drawing Sheets

(56) References Cited

U.S. PATENT DOCUMENTS

| | | | |
|---|---|---|---|
| 2013/0181999 | A1 | 7/2013 | Malakapalli et al. |
| 2016/0055667 | A1 | 2/2016 | Goel et al. |
| 2016/0300320 | A1 | 10/2016 | Iourcha et al. |
| 2017/0141125 | A1* | 5/2017 | Tada .................. H01L 27/11807 |
| 2019/0213009 | A1* | 7/2019 | Burgess .............. G06F 9/30003 |
| 2020/0210238 | A1* | 7/2020 | Appu .................... G06T 15/005 |

OTHER PUBLICATIONS

International Preliminary Report on Patentability issued in Application No. PCT/US2021/019790 dated Sep. 9, 2022, 8 Pages.

Anonymous: "Introducing RDNA Architecture", Jan. 2019, XP093109841, Retrieved from the Internet: URL: https://www.amd.com/system/files/documents/rdna-whitepaper.pdf [retrieved on Dec. 7, 2023].

Anonymous: "AMD Graphics Cores Next (GCN) Architecture", White Paper—AMD, Jun. 30, 2012 (Jun. 30, 2012), XP055217702, Retrieved from the Internet: URL: https://www.amd.com/Documents/GCN_Architecture_whitepaper.pdf [retrieved on Oct. 1, 2015].

Anonymous: "Graphics—SGX543MP4", Aug. 19, 2018 (Aug. 19, 2018), XP093110259, Retrieved from the Internet: URL: https://www.psdevwiki.com/vita/index.php?title=Graphics&oldid=6385 [retrieved on Dec. 8, 2023].

Paglierani Pietro: "High Performance Computing and Network Function Virtualization: A major challenge towards network programmability", 2015 IEEE International Black Sea Conference On Communications and Networking (Blackseacom), IEEE, May 18, 2015 (May 18, 2015), pp. 137-141, XP033191551, DOI: 10.1109/BLACKSEACOM.2015.7185102 [retrieved on Aug. 1, 2015].

Currid Andy Currid: "Delivering High-Performance Remote Graphics With Nvidia Grid Virtual GPU", 2014, XP093109427, Retrieved from the Internet: URL: https://on-demand.gputechconf.com/siggraph/2014/presentation/SG4119-Delivering-High-Performance-Remote-Graphics-NVIDIA-GRID-Virtual-GPU.pdf+A30 [retrieved on Dec. 6, 2023].

Anonymous: "Intel Virtualization Technology for Directed I/O", Jun. 2019, XP093109506, Retrieved from the Internet: URL: https://web.archive.org/web/20191021174134if_/https://software.intel.com/sites/default/files/managed/c5/15/vt-directed-io-spec.pdf [retrieved on Dec. 6, 2023].

Anonymous: "AMD I/O Virtualization Technology (IOMMU) Specification" Dec. 2016, XP093109495, Retrieved from the Internet: URL: https://web.archive.org/web/20190315070243if_/https://www.amd.com/system/files/TechDocs/48882_IOMMU.pdf [retrieved on Dec. 6, 2023].

Knuth Gabe: "AMD's approach to GPU virtualization", 2017, XP093108799, Retrieved from the Internet: URL: https://www.amd.com/system/files/documents/gpu-consistency-security-whitepaper.pdf [retrieved on Dec. 5, 2023].

Extended European Search Report issued in U.S. Appl. No. 21/760,647, mailed Jan. 3, 2024, 13 pages.

* cited by examiner

FULLY UTILIZED HARDWARE IN A MULTI-TENANCY GRAPHICS PROCESSING UNIT

BACKGROUND

Gaming and other graphics-intensive applications are voracious consumers of the physical resources of graphics processing units (GPUs), which include shader engines and fixed function hardware units that are used to implement graphics pipelines as user-defined reconfigurable virtual pipelines. For example, a conventional graphics pipeline for processing three-dimensional (3-D) graphics is formed of a sequence of fixed-function hardware block arrangements supported by programmable shaders. These arrangements are usually configured via a graphics application programming interface (API) such as the APIs defined by Microsoft DX 11/12, Khronos Group, OpenGL, Vulkan, and the like. Games are typically played on consoles (such as Xbox and PlayStation 4) and personal computers (PCs) that are optimized to handle the graphics processing requirements of the games. However, consoles and gaming PCs are expensive and some games are only available in one of the gaming formats. Cloud gaming overcomes these drawbacks by moving the graphics processing to GPUs in cloud servers that stream the rendered graphics to the user, thereby reducing the user's hardware requirements and allowing the user to play games in multiple formats.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

A graphics processing unit (GPU) in a cloud server includes front end (FE) hardware to handle tasks such as fetching commands, handling jitter, performing geometry operations, and performing ray tracing. The FE hardware typically includes command fetchers, queues such as first-in-first-out (FIFO) buffers to hold fetched commands, and a scheduler that schedules commands from the command buffer for execution on shader engines in the GPU. The shader engines are implemented using one or more processors and one or more arithmetic logic units (ALUs) to execute commands provided by the FE hardware. Results produced by the shaders, such as values of shaded pixels, are output to one or more caches that store frequently used information that is also stored in corresponding memories. The GPU therefore includes memory or registers to hold results, caches, ports, and interfaces between these entities. Information flows from the FE hardware to the memory via paths that include command buses to carry commands from the FE hardware to the shader engines, caches to store output from the shader engines, and memory channels to convey cached information to the memory. The resources of the GPU therefore include the bandwidth used to convey commands and data over the command bus to the shader engines, the caches that store results produced by the shader engines, and the memory channels that convey information between the caches and the memory.

The set of GPUs in a cloud server executes a dynamically changing mix of different applications. For example, a cloud server could be executing four easy games (with relatively low resource consumption) during a first time interval, two moderate games (with middling resource consumption) during a second time interval, and a single complex game (with relatively high resource consumption) during a third time interval. The games executing on a cloud server should be isolated from each other so that each game on the cloud server is unaffected by the other games executing on the cloud server. Thus, applications executing on a GPU should not be permitted to share a path through the GPU because concurrently executing applications influence the performance of the other applications if they rely on the same shared path (or portion of a path). Consequently, when multiple applications are executing concurrently on a conventional GPU, only one application at a time is given access to a path from the FE hardware to the memory via shared buses, caches, and memory channels in the GPU, which is sometimes referred to as an "hourglass problem."

FIGS. 1-13 disclose embodiments of a GPU that provides resource isolation between applications executing concurrently on the GPU using spatial partitioning of resources of the GPU. In some embodiments, the GPU partitions a command bus that conveys commands from front-end (FE) hardware to a subset of shader engines that is allocated to an application, a shared cache that receives output from the subset of the shader engines, and memory channels between the shared cache and a memory. The spatial partitioning is performed based on characteristics of the concurrent applications such as the complexities of the applications, the graphics resolutions, and the like. The command bus partition for each application is mapped to a corresponding partition of the shared cache and partition of the memory channels. Some embodiments of the GPU include multiple FE circuits, a command bus that implements a set of lanes, a set of shader engines, a cache that is shared by the shader engines, and a data fabric that supports a set of memory channels between the cache and a memory. The lanes of the command bus, the cache, and the set of memory channels are then partitioned between applications that are executing concurrently on the GPU. For example, if first and second applications are executing concurrently on the GPU, a first subset of the lanes are allocated to convey commands produced by the first application from a first subset of the FE circuits to a first subset of the shader engines and a second subset of the lanes are allocated to convey commands produced by the second application from a second subset of the FE circuits to a second subset of the shader engines. Results produced by the first and second subsets of the shader engines are provided to first and second portions of the cache, respectively. First and second subsets of the memory channels are then used to write back information from the first and second portions of the cache, respectively, to the memory. In some embodiments, the first and second subsets of the memory channels are mapped to different portions of the memory, e.g., by writing information to memory locations indicated by first and second base addresses and a memory stride.

Figure 1:
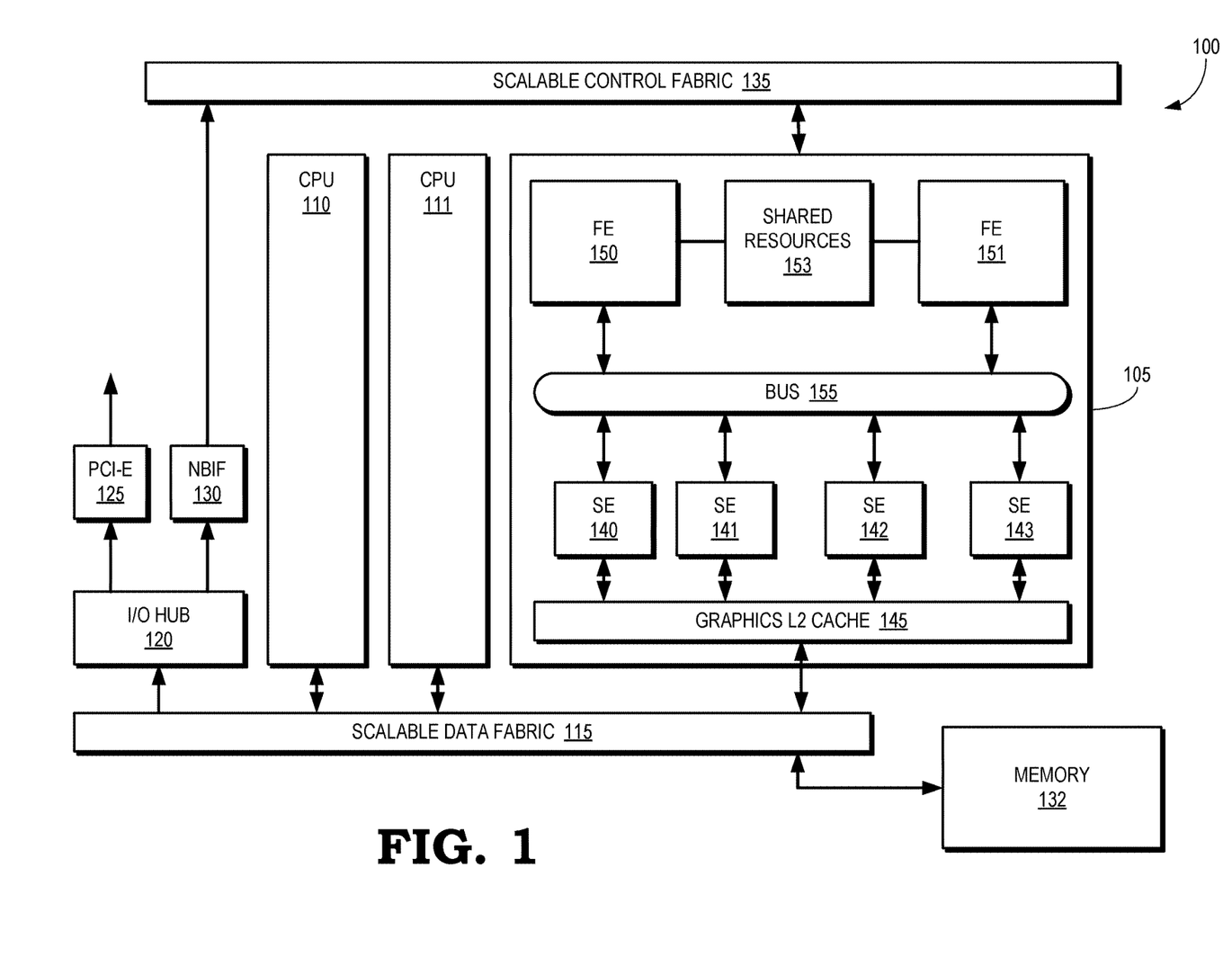
FIG. 1 is a block diagram of a processing system that implements spatial partitioning and full utilizable hardware in a multi-tenancy graphics processing unit (GPU) according to some embodiments.

FIG. 1 is a block diagram of a processing system 100 that implements spatial partitioning and full utilizable hardware in a multi-tenancy graphics processing unit (GPU) 105 according to some embodiments. The processing system 100 includes one or more central processing units (CPUs) 110, 111. Although two CPUs 110, 111 are shown in FIG. 1, some embodiments of the processing system 100 include more or fewer CPUs. A scalable data fabric (SDF) 115 supports data flows between endpoints within the processing system 100. Some embodiments of the SDF 115 support data flows between connecting points such as peripheral component interface (PCI) physical layers, memory controllers, universal serial bus (USB) hubs, computing and execution units including the GPU 105 and the CPUs 110, 111, as well as other endpoints. In the illustrated embodiment, the SDF 115 is connected to an input/output (I/O) hub 120, which is in turn connected to a PCI express (PCI-E) bus 125 and a north bound interface (NBIF) 130. The SDF 115 also provides a set of memory channels for communication with a memory 132, which is implemented using dynamic random access memory (DRAM) or other memory types. A scalable control fabric (SCF) 135 provides a control communication plane that conveys system control signals within the processing system 100. Examples of system control signals are control signals used to support thermal and power management, tests, security, and the like.

The GPU 105 includes a set of shader engines (SE) 140, 141, 142, 143 (collectively referred to herein as "the SE 140-143") that are used to execute commands concurrently or in parallel. Some embodiments of the SE 140-143 are configured using information in draw calls received from one of the CPUs 110, 111 to shade vertices of primitives that represent a model of a scene. The SE 140-143 also shade the pixels generated based on the shaded primitives and provide the shaded pixels to a display for presentation to user, e.g., via the I/O hub 120. Although four shader engines are shown in FIG. 1, some embodiments of the GPU 105 include more or fewer shader engines. The SE 140-143 are connected to a graphics L2 cache 145 that stores frequently used data and instructions. In some embodiments, the L2 cache 145 is connected to one or more L1 caches that are implemented in the SE 140-143 and one or more L3 caches (or other last level caches) implemented in the processing system 100. The caches form a cache hierarchy that includes the L2 cache 145. The other caches in the cache hierarchy are not shown in FIG. 1 in the interest of clarity.

Front end (FE) circuits in the GPU 105 fetch primitives for geometry workloads, schedule geometry workloads for execution on the shader engines and, in some cases, handle serial synchronization, state updates, draw calls, cache activities, and tessellation of primitives. The FE circuits in the GPU 105 include FE circuits 150, 151, although some embodiments of the FE circuits are partitioned to include additional FE circuits, as discussed herein. The FE circuitry also includes (or has access to) shared resources 153 that are shared by (and partitioned between) the FE circuits 150, 151. For example, the shared resources 153 are partitioned into two portions that are separately allocated to the FE circuits 150, 151 when both the FE circuits 150, 151 are active and executing different threads or applications. For another example, the shared resources 153 are all allocated to a single FE circuit if only one of the FE circuits 150, 151 is active or if the combined resources of the FE circuits 150, 151 are used to support a single thread or application. The shared resources 153 include caches, arithmetic logic units (ALUs), and the like. The FE circuits 150, 151 are coupled to a bus 155 that conveys commands to the SE 140-143, as well as data associated with the commands. Some embodiments of the bus 155 are a command bus such as a graphics register bus manager (GRBM) that act as a hub for register read and write operations that support multiple masters and multiple slaves. The GRBM is implemented in a daisy store configuration in some cases.

Spatial partitioning of resources of the GPU 105 allows the GPU 105 to execute concurrently different workloads or threads associated with different applications. For example, a first subset of the SE 140-143 can execute commands for a first application concurrently with a second subset of the SE 140-143 executing commands for a second application. Subsets of the set of FE circuits 150, 151 schedule geometry workloads for subsets of the set of SE 140-143 based on a mapping, which is determined based on characteristics of the workloads or applications in some cases. The GPU 105 also includes a set of physical paths (not shown in FIG. 1 in the interest of clarity) that convey information from the FE circuits 150, 151 to the memory 132 via the SE 140-143. Subsets of the set of physical paths are allocated to combinations of subsets of the set of FE circuits 150, 151 and the subsets of the set of SE 140-143 based on the mapping. The mapping determines information stored in a set of registers (not shown in FIG. 1 in the interest of clarity) used to configure the GPU 105. In some cases, the set of registers store information indicating a spatial partitioning of the set of physical paths, which is used to provide isolation between commands associated with different applications. In some embodiments, physical paths in different spatial partitions are granted exclusive access to their corresponding allocated physical paths so that the physical path allocated to one combination of subsets of the FE circuits 150, 151 and the SE 140-143 is only used by the combination and is not available for use by any other combination of subsets of the FE circuits 150, 151 and the SE 140-143.

Figure 2:
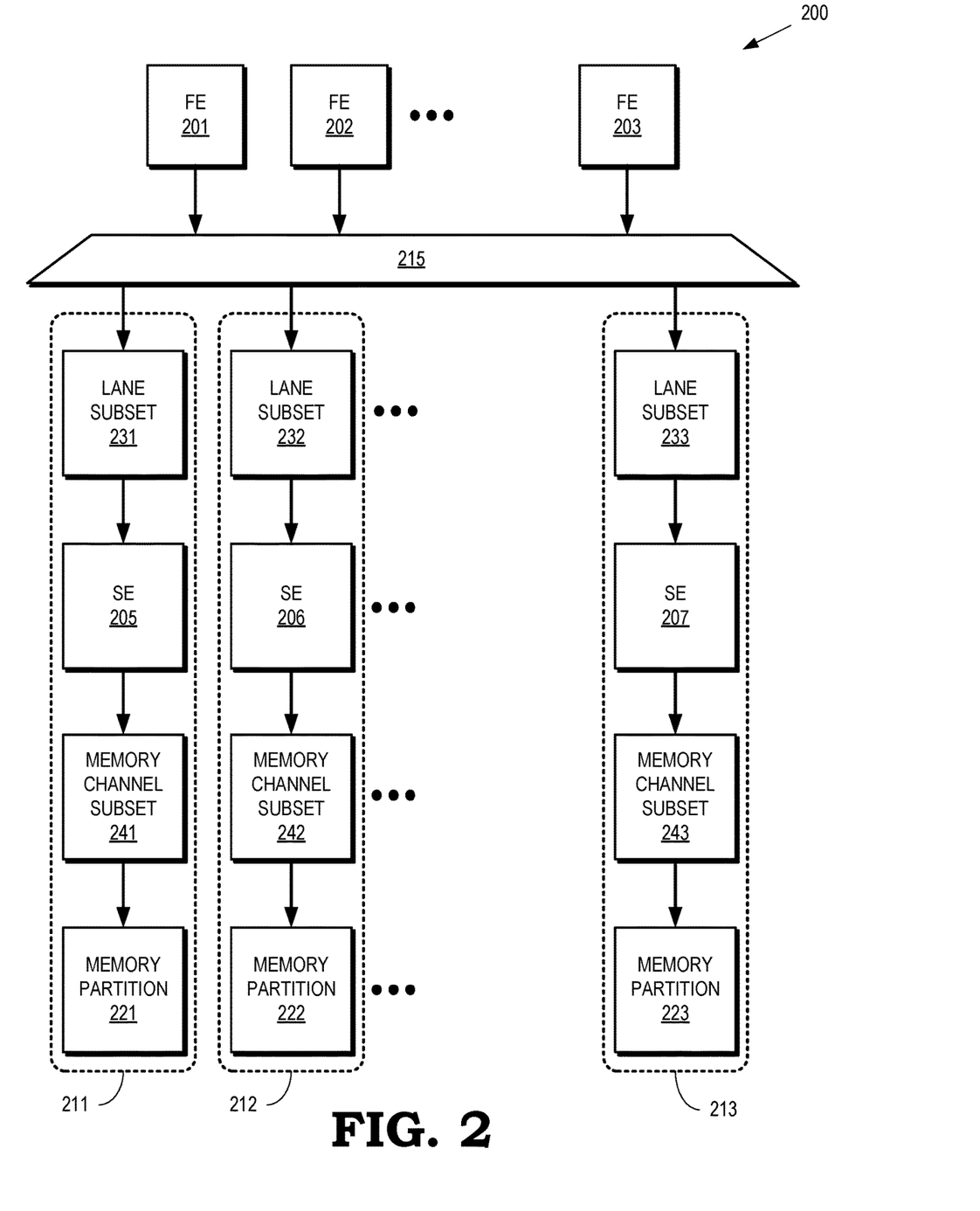
FIG. 2 is a block diagram of a GPU that uses flexible spatial partitioning to improve hardware utilization according to some embodiments.

FIG. 2 is a block diagram of a GPU 200 that uses flexible spatial partitioning to improve hardware utilization according to some embodiments. The GPU 200 is used to implement some embodiments of the GPU 105 shown in FIG. 1. The GPU 200 includes a set of FE circuits 201, 202, 203, which are collectively referred to herein as "the FE circuits 201-203." As used herein, the phrase "set of FE circuits" refers to different physical components that are turned on or off as needed, as well as different threads that utilize a multithreaded FE circuit. As discussed herein, the FE circuits 201-203 perform front end functionality including scheduling command buffers for execution on corresponding SE 205, 206, 207, which are collectively referred to herein as "the SE 205-207." The FE circuits 201-203 are selectively connected to different paths that are formed by spatially partitioning the resources of the GPU 200. In the illustrated embodiment, the FE circuits 201-203 are selectively connected to the paths 211, 212, 213 using switching circuitry 215. Although the switching circuitry 215 is represented as a demultiplexer in FIG. 2, the switching circuitry 215 can also include one or more switches, data fabrics, routers, multiplexers, demultiplexers, and the like. The switching circuitry 215, as well as other portions of the spatially partitioned paths, are configured based on values stored in configuration registers (not shown in FIG. 2 in the interest of clarity).

The spatially partitioned paths 211-213 provide a path for commands and data that flows from the FE circuits 201-203 to a memory via the SE 205-207. In the illustrated embodiment, the memory is partitioned into memory partitions 221, 222, 223, which are collectively referred to herein as "the memory partitions 221-223." The resources of the GPU 200 include a command bus including multiple lanes to convey information between the FE circuits 201-203 and the SE 205-207. The spatially partitioned paths therefore include subsets 231, 232, 233 of the lanes of the command bus, which are collectively referred to herein as "the lane subsets 231-233." The resources of the GPU 200 also include a set of memory channels that convey information produced by the SE 205-207 to the memory. The spatially partitioned paths therefore include subsets 241, 242, 243 of the memory channels, which are collectively referred to herein as "the memory channel subsets 241-243."

In the illustrated embodiment, the switching circuitry 215 maps each of the FE circuits 201-203 to a corresponding one of the paths 211-213. However, the switching circuitry 215 also selectively and reconfigurably maps subsets of the FE circuits 201-203 to subsets or combinations of the paths 211-213. Furthermore, in some embodiments, the paths 211-213 include multiple SE 205-207 and corresponding resources of the GPU 200, as discussed herein. Allocation of the FE circuits 201-203, the SE 205-207, and the resources of the spatially partitioned paths 211-213 is determined so that the resources of the GPU 200 are fully utilized when executing different numbers of applications or threads. For example, if a single thread is executing on the GPU 200, the FE circuits 201-203, the SE 205-207, and the resources of the spatially partitioned paths 211-213 are allocated to the single thread. For another example, if multiple threads are executing on the GPU 200, the FE circuits 201-203, the SE 205-207, and the resources of the spatially partitioned paths 211-213 are partitioned and shared between the multiple threads, as discussed herein.

Figure 3:
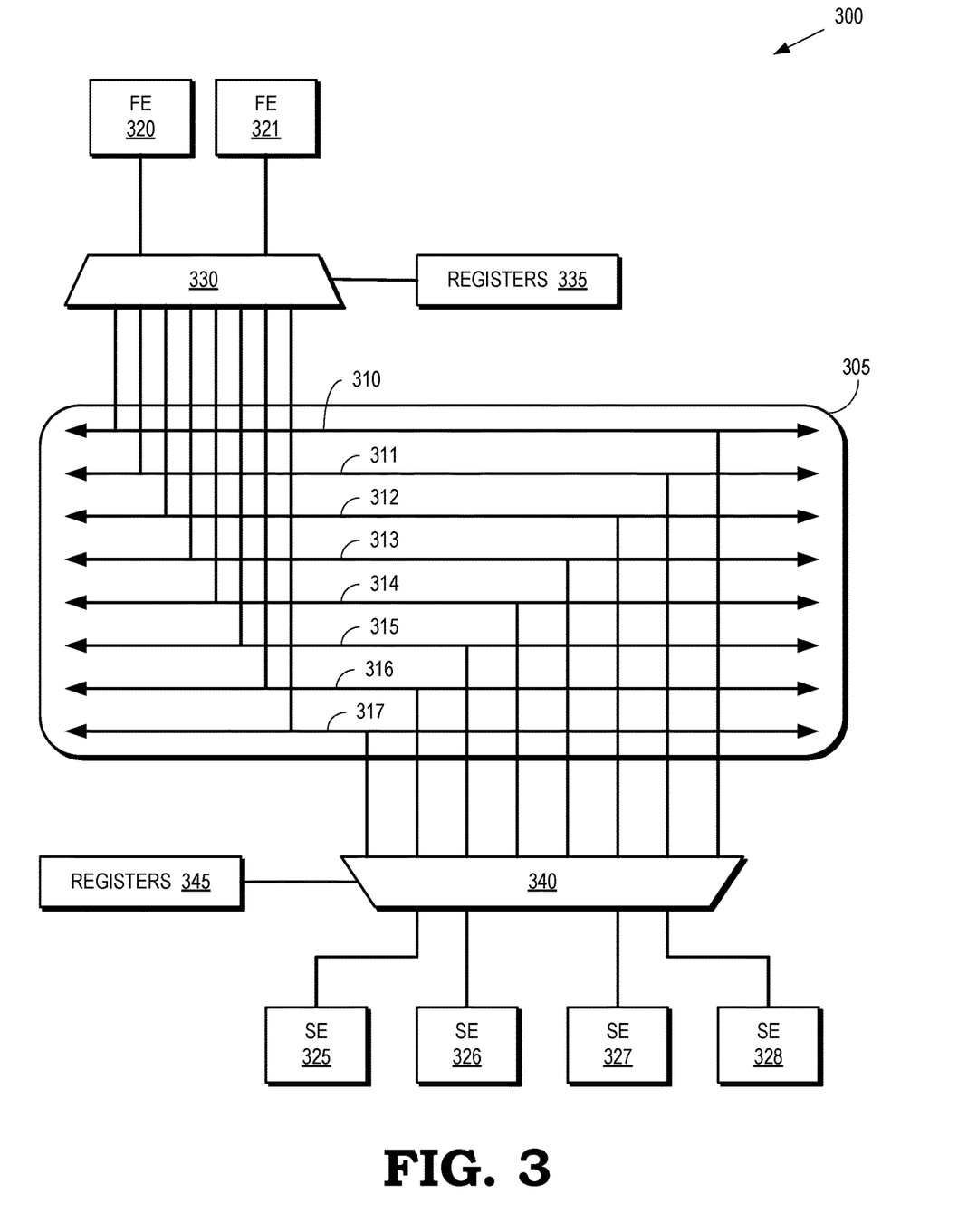
FIG. 3 is a block diagram of a portion of the GPU that includes a command bus that is configured for spatial partitioning according to some embodiments.

FIG. 3 is a block diagram of a portion 300 of the GPU that includes a command bus 305 that is configured for spatial partitioning according to some embodiments. The portion 300 is used to implement some embodiments of the GPU 105 shown in FIG. 1. The command bus 305 includes lanes 310, 311, 312, 313, 314, 315, 316, 317 (collectively referred to herein as "the lanes 310-317") that independently convey information between a set of FE circuits 320, 321 and a set of SE 325, 326, 327, 328, which are collectively referred to herein as "the SE 325-328."

The portion 300 includes switching circuitry 330 that selectively connects subsets of the FE circuit 320, 321 to corresponding subsets of the lanes 310-317. In some embodiments, the switching circuitry 330 is configured based on information stored in one or more registers 335. The portion 300 also includes switching circuitry 340 that selectively connects subsets of the lanes 310-317 to subsets of the SE 325-328. In some embodiments, the switching circuitry 340 is configured based on information stored in one or more registers 345. The information stored in the registers 335, 345 represents a mapping that associates subsets of the FE circuitry 320, 321 with corresponding subsets of the SE 325-328. The switching circuitry 330, 340 uses the information stored in the registers 335, 345 to partition the lanes 310-317 to form physical paths between the subsets of the FE circuitry 320, 321 and the corresponding subsets of the SE 325-328. Mutually exclusive subsets of the lanes 310-317 are therefore provided to convey information between the subsets of the FE circuitry 320, 321 and the corresponding subsets of the SE 325-328, which provides isolation between the commands processed by the portion 300 of the GPU for different allocations that are associated with the different physical paths.

Figure 4:
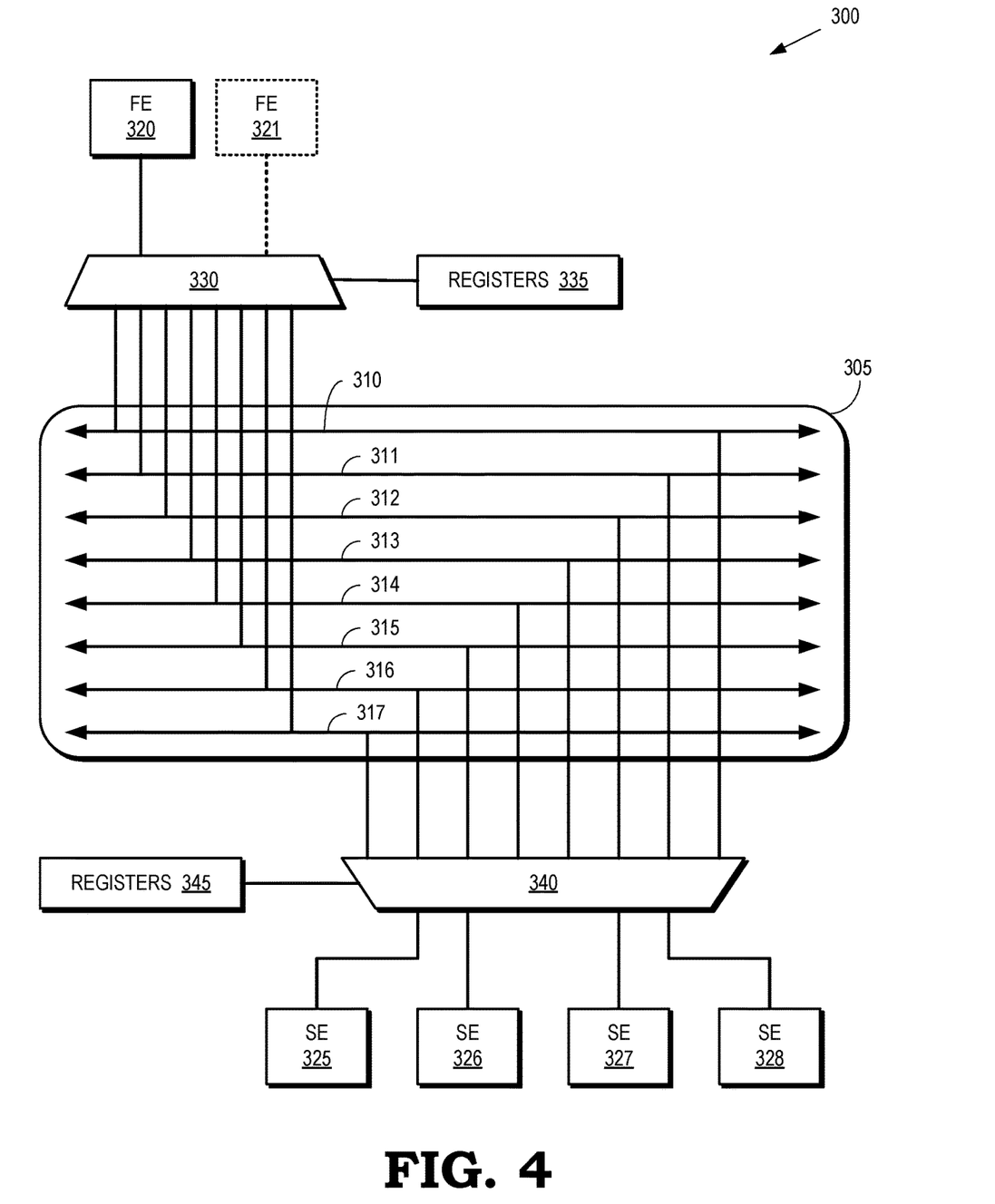
FIG. 4 is a block diagram of the portion of the GPU that includes a command bus that is spatially partitioned to allow a single front end (FE) circuitry to schedule commands for a set of shader engines (SE) according to some embodiments.

FIG. 4 is a block diagram of the portion 300 of the GPU that includes a command bus 305 that is spatially partitioned to allow a single FE circuitry to schedule commands for a set of SE according to some embodiments. As discussed herein with regard to FIG. 3, the command bus 305 includes a set of lanes 310-317 that convey information between subsets of the FE circuitry 320, 321 and SE 325-328. In the illustrated embodiment, switching circuitry 330 is configured, based on the information stored in the registers 335, to allocate the entire set of lanes 310-317 to a subset of the FE circuitry that includes the FE circuitry 320. The switching circuitry 330 does not provide access to any of the lanes 310-317 to another subset of the FE circuitry that includes the FE circuitry 321, as indicated by the dashed outline of the box that represents the FE circuitry 321. The switching circuitry 340 is configured, based on the information stored in the registers 345, to connect the lanes 310-317 to the set of SE 325-328. Thus, the spatial partitioning provides the FE circuitry 320 with exclusive access to the physical path including the lanes 310-317. The FE circuitry 320 uses the lanes 310-317 to schedule an provide commands to the set of SE 325-328.

Figure 5:
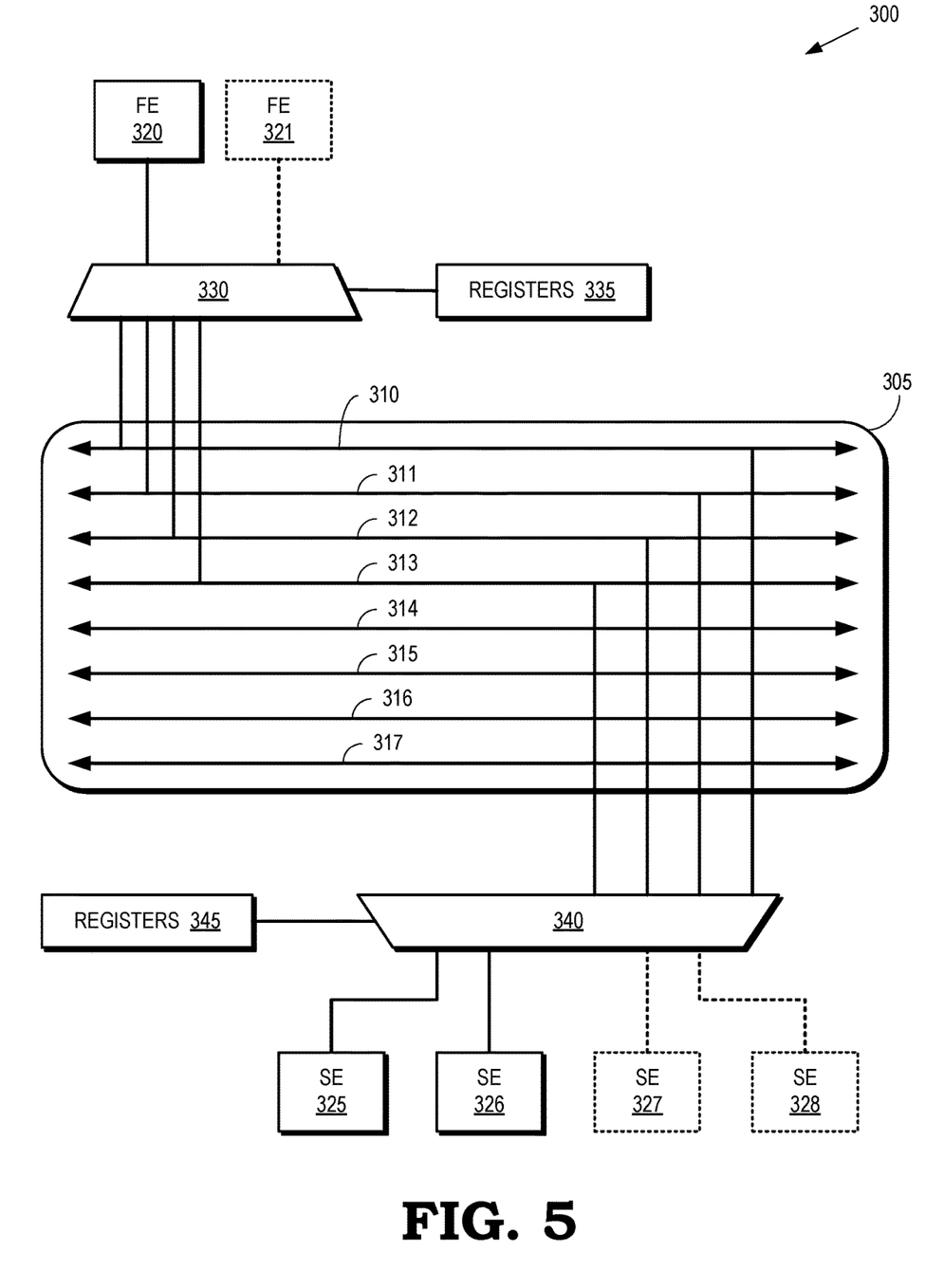
FIG. 5 is a block diagram of the portion of the GPU that includes a command bus 305 that is spatially partitioned to provide a first physical path between a first subset of FE circuitry and a first subset of the set of SE according to some embodiments.

FIG. 5 is a block diagram of the portion 300 of the GPU that includes a command bus 305 that is spatially partitioned to provide a first physical path between a first subset of FE circuitry and a first subset of the set of SE according to some embodiments. As discussed herein with regard to FIG. 3, the command bus 305 includes a set of lanes 310-317 that convey information between subsets of the FE circuitry 320, 321 and SE 325-328. In the illustrated embodiment, switching circuitry 330 is configured, based on the information stored in the registers 335, to provide the FE circuitry 320 with exclusive access to a first subset including the lanes 310-313. The switching circuitry 330 does not provide the FE circuitry 321 with access to the first subset of the lanes 310-313, as indicated by the dashed outline of the box that represents the FE circuitry 321. The switching circuitry 340 is configured, based on the information stored in the registers 345, to connect the lanes 310-313 to a first subset of the SE 325, 326. The switching circuitry 340 does not connect the lanes 310-313 to a second subset of the SE 327, 328. Thus, the spatial partitioning provides the FE circuitry 320 with exclusive access to the physical path including the lanes 310-313. The FE circuitry 320 uses the lanes 310-313 to schedule and provide commands to the set of SE 325, 326.

Figure 6:
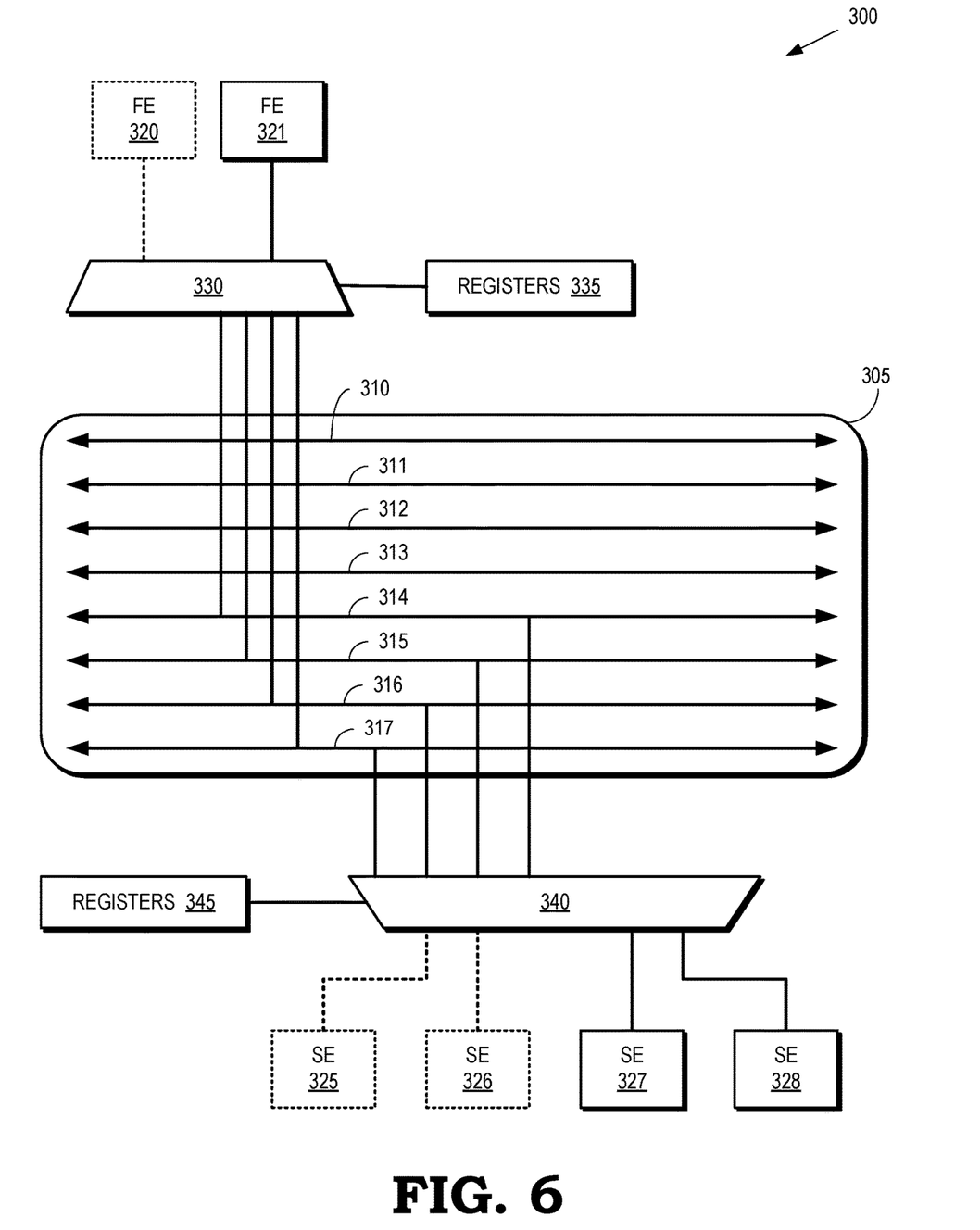
FIG. 6 is a block diagram of the portion of the GPU that includes a command bus that is spatially partitioned to provide a second physical path between a second subset of FE circuitry and a second subset of the set of SE according to some embodiments.

FIG. 6 is a block diagram of the portion 300 of the GPU that includes a command bus 305 that is spatially partitioned to provide a second physical path between a second subset of FE circuitry and a second subset of the set of SE according to some embodiments. As discussed herein with regard to FIG. 3, the command bus 305 includes a set of lanes 310-317 that convey information between subsets of the FE circuitry 320, 321 and SE 325-328. In the illustrated embodiment, switching circuitry 330 is configured, based on the information stored in the registers 335, to provide the FE circuitry 321 with exclusive access to a second subset including the lanes 314-317. The switching circuitry 330 does not provide the FE circuitry 320 with access to the second subset of the lanes 314-317, as indicated by the dashed outline of the box that represents the FE circuitry 320. The switching circuitry 340 is configured, based on the information stored in the registers 345, to connect the lanes 314-317 to a second subset of the SE 327, 328. The switching circuitry 340 does not connect the lanes 314-317 to a first subset of the SE 325, 326. Thus, the spatial partitioning provides the FE circuitry 321 with exclusive access to the physical path including the lanes 314-317. The FE circuitry 321 uses the lanes 314-317 to schedule and provide commands to the set of SE 327, 328. Thus, the physical paths allocated to the FE circuitry 320 (as shown in FIG. 5) are used concurrently with the physical paths allocated to the FE circuitry 321, as shown in FIG. 6.

Figure 7:
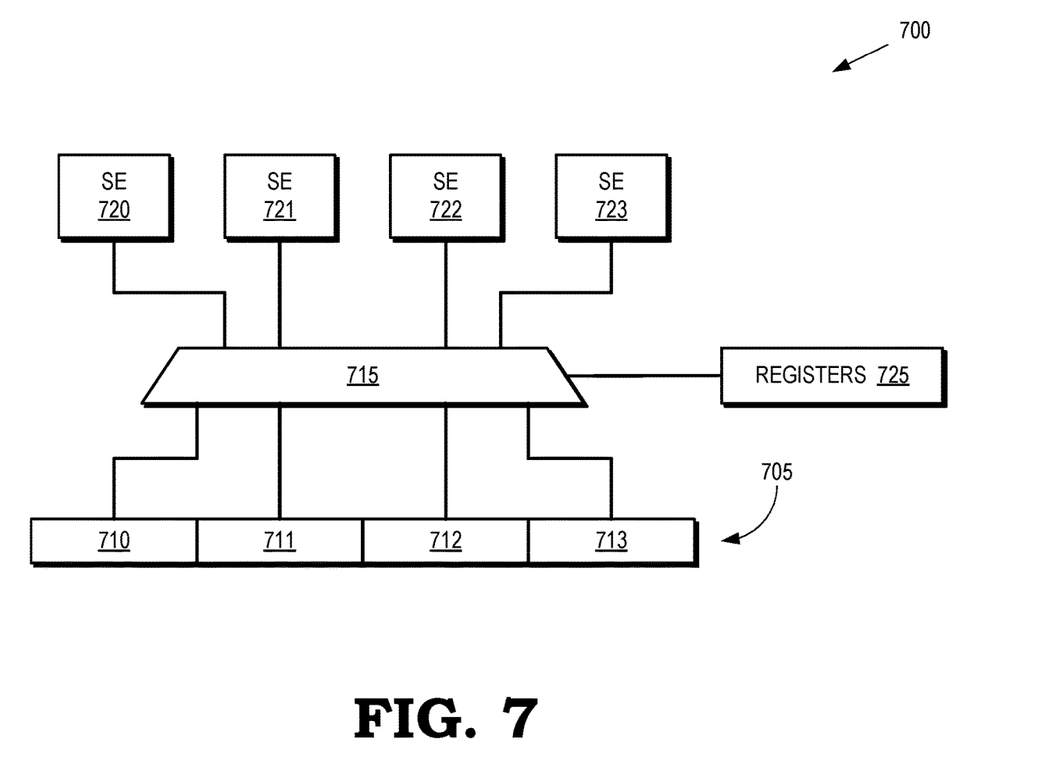
FIG. 7 is a block diagram of a portion of a GPU that includes a cache that is available for spatial partitioning according to some embodiments.

FIG. 7 is a block diagram of a portion 700 of a GPU that includes a cache 705 that is available for spatial partitioning according to some embodiments. The portion 700 is used to implement some embodiments of the GPU 105 shown in FIG. 1. The cache 705 is selectively partitioned to allocate portions 710, 711, 712, 713 (collectively referred to herein as "the cache portions 710-713") to different physical paths associated with different applications and subsets of FE circuitry. The portion 700 of the GPU also includes switching circuitry 715 that selectively connects subsets of SE 720, 721, 722, 723 (collectively referred to herein as "the SE 720-723") to the cache portions 710-713. The switching circuitry 715 is configured based on information stored in the registers 725. The cache portions 710-713 are therefore part of the physical paths that are used to convey information from the FE circuitry to memory via the SE 720-723.

In the illustrated embodiment, the cache 705 is partitioned so that the cache portions 710-713 are part of different physical paths. The switching circuitry 715 connects the SE 720 to the cache portion 710, the SE 721 to the cache portion 711, the SE 722 to the cache portion 712, and the SE 723 to the cache portion 713. The SE 720-723 therefore have exclusive access to their corresponding cache portions 710-713 and the information stored in the cache portions 710-713 by the SE 720-723 is isolated from the information stored in other cache portions 710-713 by other SE 720-723.

Figure 8:
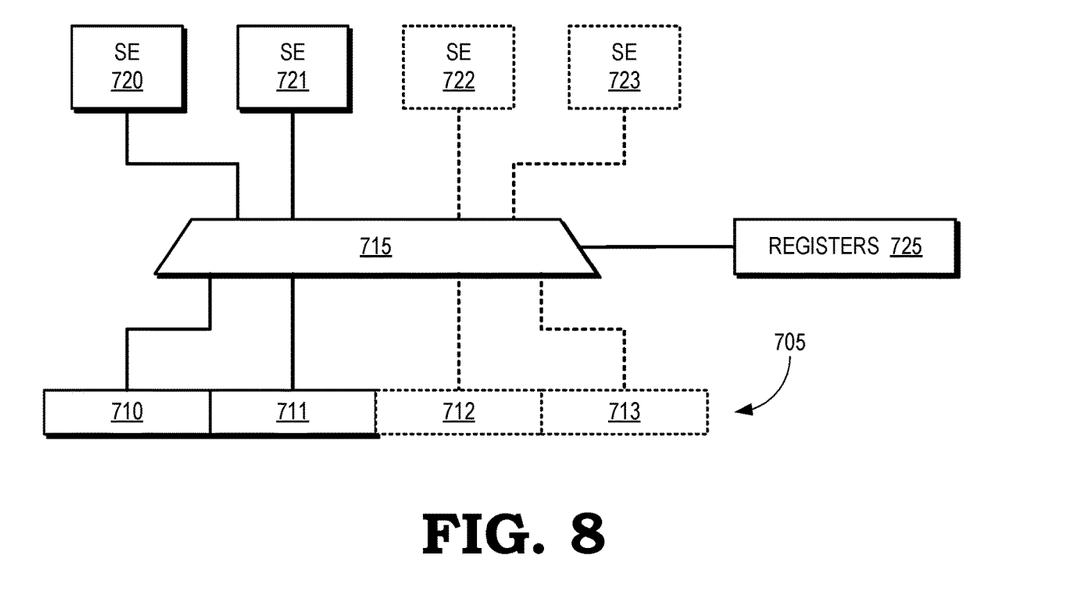
FIG. 8 is a block diagram of the portion of a GPU that includes the cache that is partitioned to provide a first subset of SE access to a first subset of cache portions according to some embodiments.

FIG. 8 is a block diagram of the portion 700 of a GPU that includes the cache 705 that is partitioned to provide a first subset of SE access to a first subset of cache portions according to some embodiments. The portion 700 is used to implement some embodiments of the GPU 105 shown in FIG. 1. In the illustrated embodiment, the cache 705 is partitioned so that the first subset of the cache portions 710, 711 is allocated to a first physical path that includes a first subset of the SE 720, 721. The switching circuitry 715 connects the first subset of the SE 720, 721 to the first subset of the cache portions 710, 711. The first subset of the SE 720, 721 utilizes the first subset of the cache portions 710, 711 as a single shared cache. The SE 720, 721 therefore have exclusive access to the shared cache resources in the first subset of the cache portions 710, 711 and the information stored in the first subset of the cache portions 710, 711 by the first subset of the SE 720, 721 is isolated from the information stored in other cache portions 712, 713 by other SE 722, 723.

Figure 9:
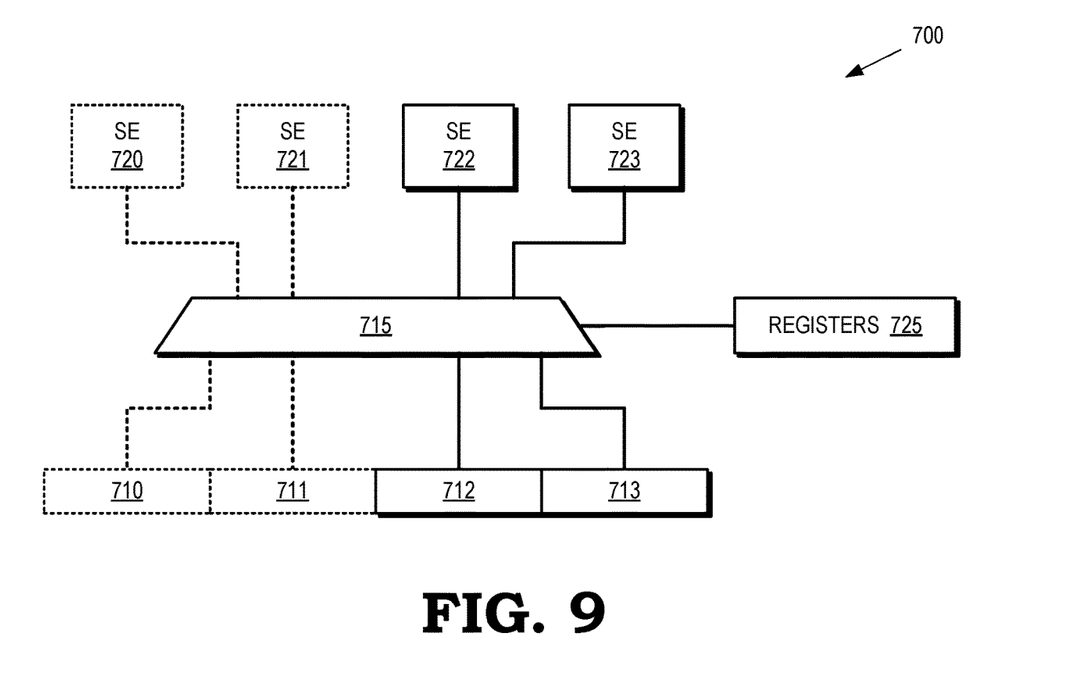
FIG. 9 is a block diagram of the portion of a GPU that includes the cache that is partitioned to provide a second subset of SE access to a second subset of cache portions according to some embodiments.

FIG. 9 is a block diagram of the portion 700 of a GPU that includes the cache 705 that is partitioned to provide a second subset of SE access to a second subset of cache portions according to some embodiments. The portion 700 is used to implement some embodiments of the GPU 105 shown in FIG. 1. In the illustrated embodiment, the cache 705 is partitioned so that the second subset of the cache portions 712, 713 is allocated to a second physical path that includes a second subset of the SE 722, 723. The switching circuitry 715 connects the second subset of the SE 722, 723 to the second subset of the cache portions 712, 713. The second subset of the SE 722, 723 utilizes the second subset of the cache portions 712, 713 as a single shared cache. The SE 722, 723 therefore have exclusive access to the shared cache resources in the second subset of the cache portions 712, 713 and the information stored in the second subset of the cache portions 712, 713 by the second subset of the SE 722, 723 is isolated from the information stored in other cache portions 710, 711 by other SE 720, 721. Thus, the physical paths that include the first subset of the cache portions 710, 711 (as shown in FIG. 8) are used concurrently with the physical paths allocated to the second subset of the cache portions 712, 713, as shown in FIG. 9.

Figure 10:
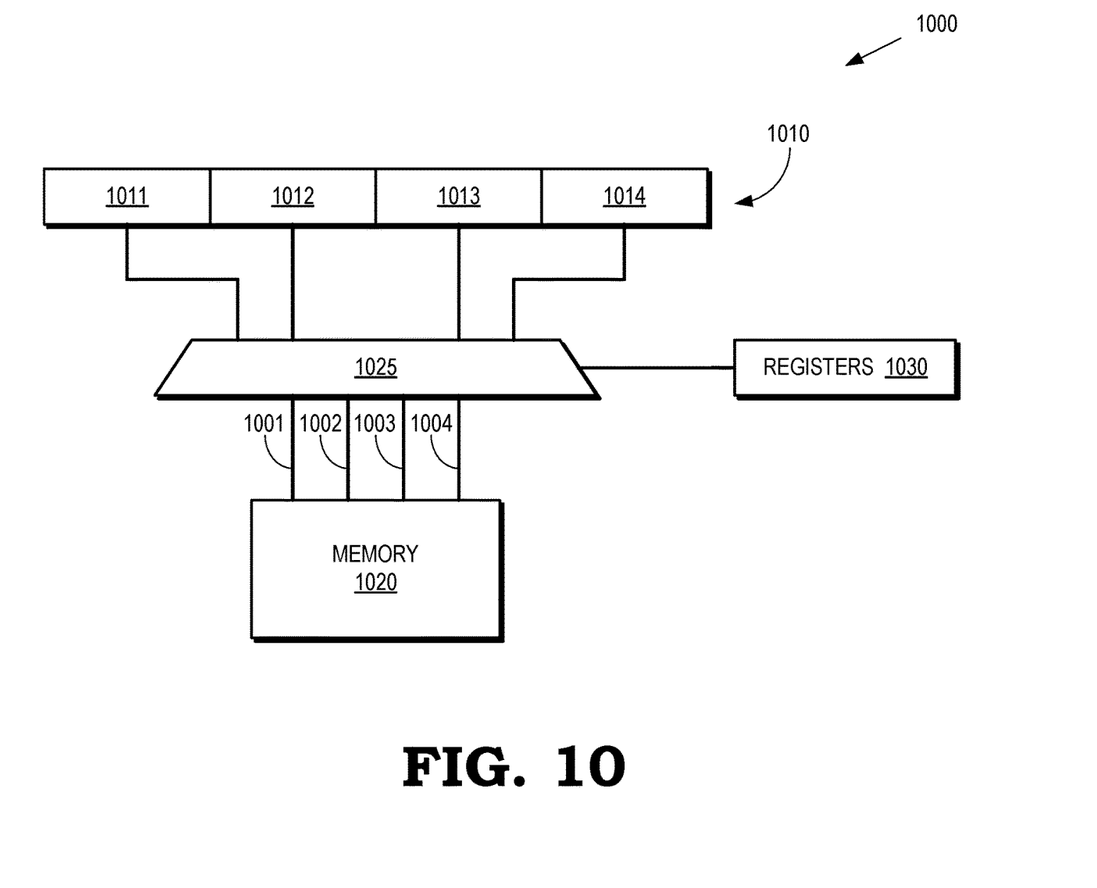
FIG. 10 is a block diagram of a portion of a GPU that includes a set of memory channels that are available for spatial partitioning according to some embodiments.

FIG. 10 is a block diagram of a portion 1000 of a GPU that includes a set of memory channels that are available for spatial partitioning according to some embodiments. The portion 1000 of the GPU is used to implement some embodiments of the GPU 105 shown in FIG. 1. Memory channels 1001, 1002, 1003, 1004 (collectively referred to herein as "the memory channels 1001-1004") are used to provide paths between a cache 1010 that is available for partitioning into portions 1011, 1012, 1013, 1014 (collectively referred to herein as "the cache portions 1011-1014") and a memory 1020. Switching circuitry 1025 selectively connects subsets of the cache portions 1011-1014 to the memory 1020 to form physical paths that are parts of the physical paths that include FE circuitry and SE, as discussed herein. The switching circuitry 1025 is configured using information stored in the registers 1030. In the illustrated embodiment, each of the cache portions 1011-1014 are independently connected to the memory 1020 by the switching circuitry 1025. In some embodiments, the cache portions 1011-1014 are mapped to different portions of the memory 1020, e.g., by writing information to memory locations indicated by different base addresses and a memory stride.

Figure 11:
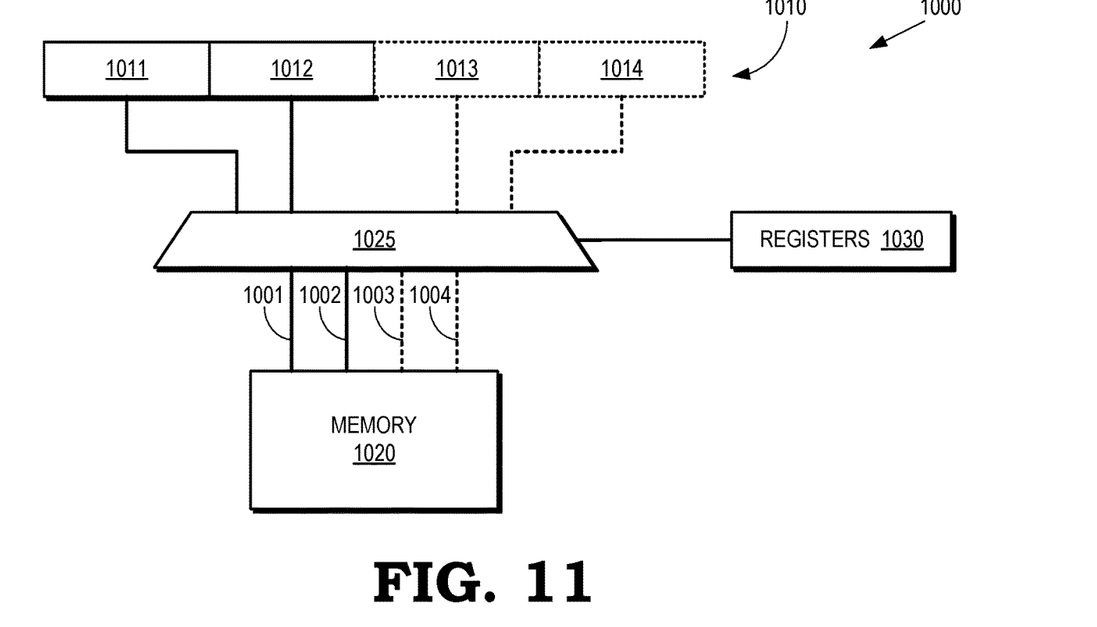
FIG. 11 is a block diagram of the portion of the GPU that includes memory lanes partitioned into a first subset that provides a first path to a memory according to some embodiments.

FIG. 11 is a block diagram of the portion 1000 of the GPU that includes memory lanes partitioned into a first subset that provides a first path to a memory according to some embodiments. The switching circuitry 1025 allocates the first subset that includes the memory lanes 1001, 1002 to a first subset of the cache portions 1011, 1012. In the illustrated embodiment, the cache portions 1011, 1012 are utilized as a single shared cache (as discussed herein) that shares the memory lanes 1001, 1002 to provide a path to the memory 1020. The switching circuitry 1025 is configured using information stored in the registers 1030. The first subset of the cache portions 1011, 1012 is provided with exclusive access to first subset of the memory lanes 1001, 1002. A second subset of the cache portions 1013, 1014 is not provided access to the first subset of the memory lanes 1001, 1002, as indicated by the dashed boxes representing the cache portions 1013, 1014.

Figure 12:
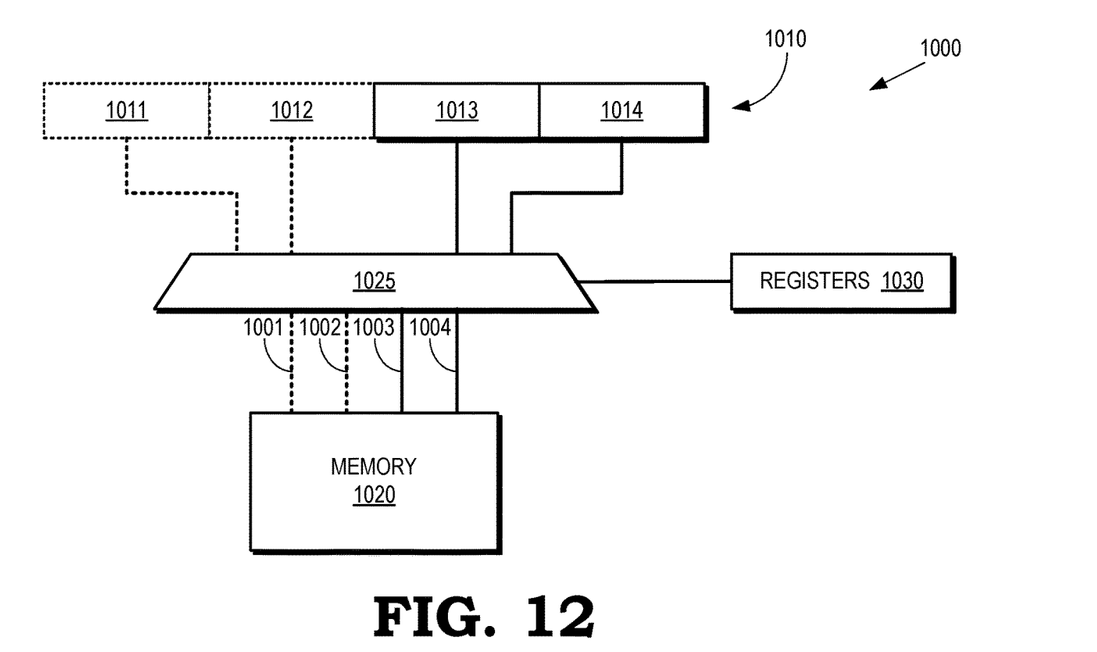
FIG. 12 is a block diagram of the portion of the GPU that includes memory lanes partitioned into a second subset that provides a second path to a memory according to some embodiments.

FIG. 12 is a block diagram of the portion 1000 of the GPU that includes memory lanes partitioned into a second subset that provides a second path to a memory according to some embodiments. The switching circuitry 1025 allocates the second subset that includes the memory lanes 1003, 1004 to a second subset of the cache portions 1013, 1014. In the illustrated embodiment, the second subset of the cache portions 1013, 1014 are utilized as a single shared cache (as discussed herein) that shares the second subset of the memory lanes 1003, 1004 to provide a path to the memory 1020. The switching circuitry 1025 is configured using information stored in the registers 1030. The second subset of the cache portions 1013, 1014 is provided with exclusive access to second subset of the memory lanes 1003, 1004. The first subset of the cache portions 1011, 1012 is not provided access to the second subset of the memory lanes 1003, 1004, as indicated by the dashed boxes representing the cache portions 1011, 1012. Thus, the paths including the first subset of the cache portions 1011, 1012 and the memory lanes 1001, 1002 (as shown in FIG. 11) are used concurrently with the paths including the second subset of the cache portions 1013, 1014 and the memory lanes 1003, 1004.

Figure 13:
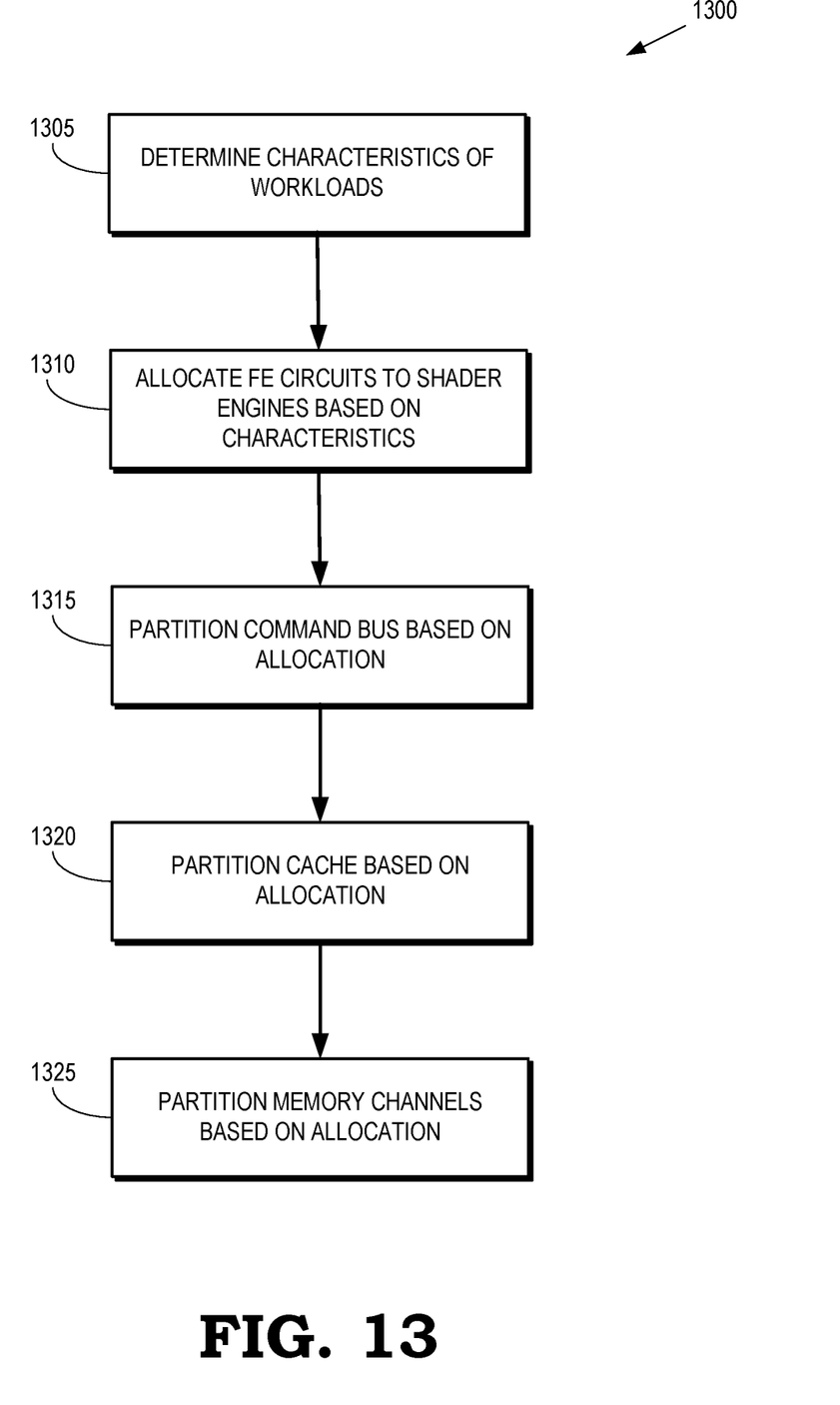
FIG. 13 is a flow diagram of a method of spatially partitioning resources of a GPU according to some embodiments.

FIG. 13 is a flow diagram of a method 1300 of spatially partitioning resources of a GPU according to some embodiments. The method 1300 is implemented in some embodiments of the GPU 105 shown in FIG. 1.

At block 1305, the GPU identifies workloads for processing and determines characteristics of the workloads. The determination is made based on an analysis of the command buffers, configuration information received from a CPU, or using other techniques. For example, the GPU can determine that the workload includes commands generated by a single application that is high complexity or requires a high graphics resolution. For another example, the GPU can determine that the workload includes commands generated by multiple applications having different complexities or graphics resolutions.

At block 1310, the GPU allocates subsets of the FE circuitry to schedule commands for corresponding subsets of SE. For example, the GPU can allocate a single FE circuit to schedule commands for a set of SE implemented in the GPU in response to determining that the workload includes high complexity or high resolution commands from a single application. For another example, the GPU can allocate subsets of FE circuits to independently schedule commands to subsets of the set of SE for a lower complexity/resolution commands from multiple applications.

At block 1310, the GPU partitions lanes of a command bus into subsets that correspond to the allocation of FE circuits to SE. For example, if a single FE circuit is allocated to schedule commands for a set of SE for a single application, a path including all the lanes of the command bus is formed. For another example, if multiple subsets of the FE circuits are allocated to schedule commands for corresponding subsets of set of SE, the lanes of the command bus are partitioned into subsets to form separate paths for each combination of a subset of the FE circuits and a corresponding subset of the set of SE.

At block 1315, the GPU partitions a cache into subsets that correspond to the allocation of FE circuits to SE. For example, if a single FE circuit is allocated to schedule commands for a set of SE for a single application, the entire cache is allocated to the path. For another example, if multiple subsets of FE circuits are allocated to schedule commands for corresponding subsets of the set of SE, the cache is partitioned into portions that are allocated to each combination of a subset of the FE circuits and a subset of the SE.

At block 1320, memory channels that connect the cache to a memory are partitioned based on the allocation of FE circuits to the SE. For example, if a single FE circuit is allocated to schedule commands for a set of SE for a single application, then all the memory channels are allocated to the path. For another example, if multiple subsets of FE circuits are allocated to schedule commands for corresponding subsets of the set of SE, the memory channels are partitioned into subsets that are allocated to each combination of a subset of the FE circuits and a subset of the SE. Thus, independent paths from the FE circuitry to the memory are provided for exclusive use by one or more applications, which can therefore run concurrently using the isolated paths.

In some embodiments, the apparatus and techniques described above are implemented in a system including one or more integrated circuit (IC) devices (also referred to as integrated circuit packages or microchips), such as the spatially partitioned GPU described above with reference to FIGS. 1-13. Electronic design automation (EDA) and computer aided design (CAD) software tools are used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device are stored in and accessed from the same computer readable storage medium or a different computer readable storage medium.

A computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium is in source code, assembly language code, object code, or other instruction format that is interpreted or otherwise executable by one or more processors.

Note that not all of the activities or elements described above in the general description are required, that a portion of a specific activity or device are not required, and that one or more further activities are performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above can be altered or modified and all such variations are considered within the scope of the disclosed subject matter. Accordingly, the protection sought herein is as set forth in the claims below.

What is claimed is:

1. An apparatus comprising:
a set of shader engines;
a set of front end (FE) circuits, wherein subsets of the set of FE circuits are configured to schedule geometry workloads for subsets of the set of shader engines based on a reconfigurable mapping; and
a set of physical paths configured to convey commands from the set of FE circuits to the set of shader engines and results from the set of shader engines to a memory, wherein subsets of the set of physical paths are allocated to the subsets of the set of FE circuits and the subsets of the set of shader engines based on the reconfigurable mapping.

2. The apparatus of claim 1, wherein the set of physical paths comprises a command bus having a set of lanes that convey the commands from the set of FE circuits to the set of shader engines, and wherein subsets of the set of lanes are allocated to the subsets of the set of FE circuits and the subsets of the set of shader engines based on the reconfigurable mapping.

3. The apparatus of claim 2, wherein the set of physical paths comprises a cache to hold results received from the set of shader engines, and wherein portions of the cache are allocated to hold results received from the subsets of the set of shader engines based on the reconfigurable mapping.

4. The apparatus of claim 3, wherein the set of physical paths comprises a set of memory channels configured to convey results from the cache to the memory, and wherein subsets of the set of memory channels are allocated to convey results from the portions of the cache to the memory.

5. The apparatus of claim 4, further comprising:
a set of registers configured to store information for configuring the set of physical paths.

6. The apparatus of claim 5, wherein the set of registers comprises a first subset of registers to store information used to allocate the subsets of the set of lanes to the subsets of the set of FE circuits based on the reconfigurable mapping, a second subset of registers to store information used to partition the cache and allocate the portions to hold results received from the subsets of the set of shader engines, and a third subset of registers configured to allocate the subsets of the set of memory channels to convey results from the portions of the cache to the memory.

7. The apparatus of claim 1, wherein the subsets of the set of physical paths are associated with applications that are concurrently executing on the subsets of the shader engines.

8. The apparatus of claim 7, wherein the reconfigurable mapping is determined based on characteristics of the applications.

9. The apparatus of claim 8, wherein the reconfigurable mapping is determined based on at least one of complexities and graphics resolutions associated with the applications.

10. An apparatus comprising:
a set of shader engines;
a set of front end (FE) circuits, wherein subsets of the set of FE circuits are configured to schedule geometry workloads for corresponding subsets of the set of shader engines; and
a set of registers including information indicating a reconfigurable spatial partitioning of a set of physical paths that convey commands from the set of FE circuits to the set of shader engines and results from the set of shader engines to a memory.

11. The apparatus of claim 10, wherein the reconfigurable spatial partitioning indicated by the information stored in the set of registers represents an allocation of subsets of the set of physical paths to the subsets of the set of FE circuits and the corresponding subsets of the set of shader engines.

12. The apparatus of claim 10, wherein the set of physical paths comprises a command bus having a set of lanes that convey commands from the set of FE circuits to the set of shader engines, and wherein the set of registers stores information indicating an allocation of subsets of the set of lanes to the subsets of the set of FE circuits and the subsets of the set of shader engines.

13. The apparatus of claim 12, wherein the set of physical paths comprises a cache to hold results received from the set of shader engines, and wherein the set of registers stores information indicating allocation of portions of the cache to hold results received from the subsets of the set of shader engines.

14. The apparatus of claim 13, wherein the set of physical paths comprises a set of memory channels configured to convey results from the cache to the memory, and wherein the set of registers stores information indicating allocation of subsets of the set of memory channels to convey results from the portions of the cache to the memory.

15. The apparatus of claim 14, wherein the set of registers comprises a first subset of registers to store information used to allocate the subsets of the set of lanes to the subsets of the set of FE circuits, a second subset of registers to store information used to partition the cache and allocate the portions to hold results received from the subsets of the set of shader engines, and a third subset of registers configured to allocate the subsets of the set of memory channels to convey results from the portions of the cache to the memory.

16. The apparatus of claim 11, wherein the subsets of the set of physical paths are associated with applications that are concurrently executing on the subsets of the shader engines.

17. The apparatus of claim 16, wherein a reconfigurable mapping indicating the reconfigurable spatial partitioning of the set of physical paths is determined based on characteristics of the applications.

18. The apparatus of claim 17, wherein the reconfigurable mapping is determined based on at least one of complexities and graphics resolutions associated with the applications.

19. A method comprising:
accessing a set of registers including reconfigurable mapping information that maps subsets of a set of front end (FE) circuits to corresponding subsets of a set of shader engines; and
spatially partitioning, based on the reconfigurable mapping information, a set of physical paths into subsets that convey commands from the subsets of the set of FE circuits to the corresponding subsets of the set of shader engines and corresponding results from the corresponding subsets to a memory.

20. The method of claim 19, wherein the set of physical paths comprises a command bus having a set of lanes that convey commands from the set of FE circuits to the set of shader engines, and wherein spatially partitioning the set of physical paths comprises allocating subsets of the set of lanes to the subsets of the set of FE circuits and the subsets of the set of shader engines.

21. The method of claim 20, wherein the set of physical paths comprises a cache to hold results received from the set of shader engines, and wherein spatially partitioning the set of physical paths comprises partitioning the cache in to portions to hold results received from the subsets of the set of shader engines.

22. The method of claim 21, wherein the set of physical paths comprises a set of memory channels configured to convey results from the cache to the memory, and wherein spatially partitioning the set of physical paths comprises allocating subsets of the set of memory channels to convey results from the portions of the cache to the memory.

* * * * *